(12) United States Patent
Huppunen et al.

(10) Patent No.: US 7,928,624 B2
(45) Date of Patent: Apr. 19, 2011

(54) ELECTRIC MOTOR (75) Inventors: Jussi Huppunen, Vantää (FI); Asmo Tenhunen, Hyvinkää (FI); Petri Alkula, Hameenlinna (FI); Mika Olkkonen, Hyvinkää (FI)

(73) Assignee: Kone Corporation, Hyvinkaa (FI)

( * ) Notice: Subject to any disclaimer, the term of this patent is extended or adjusted under 35 U.S.C. 154(b) by 3 days.

(21) Appl. No.: 12/486,500

(22) Filed: Jun. 17, 2009

(65) Prior Publication Data
US 2009/0251024 A1  Oct. 8, 2009

Related U.S. Application Data (63) Continuation of application No. PCT/FI2007/000278, filed on Nov. 15, 2007.

(30) Foreign Application Priority Data

Dec. 21, 2006 (FI) ........................................ 20061147

(51) Int. Cl.
*H02K 1/00* (2006.01)
(52) U.S. Cl. .................. 310/179; 310/216.73; 310/180; 310/208
(58) Field of Classification Search ............. 310/216.69–216.74, 214–216, 310/179, 180, 184, 208
See application file for complete search history.

(56) References Cited

U.S. PATENT DOCUMENTS

| | | | | |
|---|---|---|---|---|
| 3,093,764 A * | 6/1963 | King et al. | | 310/214 |
| 4,147,946 A * | 4/1979 | Linscott et al. | | 310/214 |
| 4,962,331 A * | 10/1990 | Smith | | 310/216.001 |
| 5,124,607 A * | 6/1992 | Rieber et al. | | 310/214 |
| 5,770,910 A * | 6/1998 | Horst | | 310/214 |
| 6,064,132 A * | 5/2000 | Nose | | 310/216.102 |
| 7,157,828 B2 * | 1/2007 | Moroto et al. | | 310/261.1 |
| 2005/0062358 A1* | 3/2005 | Aulanko et al. | | 310/214 |
| 2009/0230806 A1* | 9/2009 | Miyata et al. | | 310/195 |
| 2010/0117479 A1* | 5/2010 | Eastham | | 310/198 |
| 2010/0164319 A1* | 7/2010 | Metsberg et al. | | 310/208 |
| 2010/0225195 A1* | 9/2010 | Asano et al. | | 310/216.067 |
| 2010/0253176 A1* | 10/2010 | Ovrebo et al. | | 310/216.073 |

FOREIGN PATENT DOCUMENTS

| | | |
|---|---|---|
| EP | 0915553 A2 | 5/1999 |
| EP | 1257040 A2 | 11/2002 |
| JP | 9-219942 A | 8/1997 |

OTHER PUBLICATIONS

Salminen, P., "Fractional Slot Permanent Magnet Synchronous Motors for Low Speed Applications", Acta Universitatis Lappeenrantaensis 198, Dec. 20, 2004.

(Continued)

*Primary Examiner* — Thanh Lam
(74) *Attorney, Agent, or Firm* — Birch, Stewart, Kolasch & Birch, LLP (57) ABSTRACT

The present invention relates to an electric motor and to a method for manufacturing an electric motor. The electric motor comprises at least a stator (24), a rotor (25) and an air gap (26) between these, in which motor the stator and/or rotor comprises slots (4) and teeth (5) between slots, and in which the stator and/or rotor has a concentrated winding fitted in the slots. In the method of the invention, the phase windings are fitted as a concentrated fractional-slot winding.

7 Claims, 4 Drawing Sheets

OTHER PUBLICATIONS

Salminen, P. et al., "Torque Ripple of Permanent Magnet Machines with Concentrated Windings", ISEF 2005—XII International Symposium on Electromagnetic Fields in Mechatronics, Electrical and Electronic Engineering, Sep. 15-17, 2005.

Binder, A. et al., "Fixation of Buried and Surface Mounted Magnets in High-Speed Permanent Magnet Synchronous Motors", Conference record of the IEEE Industry Applications Conference, vol. 40, Part 4, pp. 2843-2848, 2005.

Ficheux, R. L. et al., "Axial-Flux Permanent-Magnet Motor for Direct-Drive Elevator Systems Without Machine Room", IEEE Transactions on Industry Applications, vol. 37, No. 6, pp. 1693-1701, Nov./Dec. 2001.

Jussila, H., "Napakäämityn murtovakokestomagneettitahtikoneen suunnittelu" Thesis, Lappeenranta University of Technology, Department of Electrical Engineering, Lappeenranta, 2005.

* cited by examiner

APPENDIX 1

ELECTRIC MOTOR

This application is a Continuation of PCT/FI2007/000278 filed on Nov. 15, 2007, which claims priority under 35 U.S.C. 119(a) to Patent Application No. 20061147 filed in Finland on Dec. 21, 2006, all of which are hereby expressly incorporated by reference into the present application.

FIELD OF THE INVENTION

The present invention relates to an electric motor as defined in claim 1 and to a method for manufacturing an electric motor as defined in claim 8.

BACKGROUND OF THE INVENTION

Electric motors are used to convert electric energy into mechanical energy. In electric motors of normal construction, it is possible to distinguish certain basic components, such as a rotor fitted to be rotatable, a rotor axle, a stationary stator, bearings and end shields. The rotor is supported by the bearings. Generally a small air gap is left between rotor and stator.

The operation of rotating multi-phase alternating current machines, such as multi-phase synchronous and asynchronous motors, is based on a magnetic field rotating within the machine. A multi-phase stator winding is formed in such a way that, when a sinusoidal voltage is fed into the phase windings—the voltages fed into the phases having a phase shift of 360/n degrees between them, where n is the number of phases—the currents flowing in the stator windings produce in the air gap of the machine a circulating magnetic field, whose interaction with the magnetic field of the rotor winding causes the rotor to rotate. In synchronous motors, the magnetic field of the rotor winding is typically generated either by permanent magnets or by a direct current fed into a rotor excitation winding. In asynchronous motors, the excitation of the rotor winding is generally effected via the voltages and currents induced in the rotor winding by the magnetic flux generated by the stator current.

The magnetic flux density distribution in the air gap is to be made as sinusoidal as possible. The rotary motion of the rotor is produced by the action of the sinusoidal fundamental wave of magnetic flux density, but in practice the magnetic field acting in the motor also contains harmonics, i.e. harmonic components of the fundamental wave.

The harmonics of the magnetic flux density generate extra force components between stator and rotor. Moreover, the magnitude of the torque fluctuates (torque ripple) and additional losses occur in the motor.

Harmonic components are created in the air gap flux density as a result of both discontinuity of the windings on the stator and rotor circumferences and variation of permeance in the air gap. The stator winding is generally concentrated in slots and coil groups, so that the magnetomotoric force produced in the air gap by the winding is not sinusoidally distributed. Variation of permeance in the air gap is caused e.g. by possible stator and rotor grooving, open poles and magnetic saturation. The harmonics of the magnetic field of an electric motor can be divided into harmonics caused by the rotor and those caused by the stator.

The windings of electric motors are traditionally distributed windings, wherein the coils of different phases are fitted in an interleaved fashion such that the area delimited by each coil also contains coil sides of other phases. Specification U.S. Pat. No. 6,581,270 describes a method for manufacturing a stator in which the coil sides are distributed into several slots in the pole area of the motor. As the coil sides of the same phase are located at a large distance from each other in the pole area, the end windings are long. A significant proportion of the conductor material used in the motor windings is not exploited, because the end windings generate no torque but cause losses and require space. Further, because in this construction the end windings of different phases cross with each other, the risk of short-circuit between coils is increased. The end windings thus require additional insulation. The winding work for preparing such windings also comprises several operations and often has to be carried out manually.

A motor provided with traditional distributed windings is also bulky and heavy due to the long end windings and the fact that the coils of a winding are usually distributed in many slots in the area of a pole pair. This is a disadvantage especially in motors used in elevators, because elevators are increasingly being implemented using machine solutions in which the machine is placed between a guide rail and a wall of the elevator shaft. Therefore, a large size and weight of the motor is a drawback.

During recent years, investigations have been undertaken to explore concentrated fractional-slot windings, because these provide solutions to certain problems associated with traditional windings. In a concentrated winding, the coil sides of the same coil are placed in adjacent slots. Thus, the end windings are shorter and do not take up so much space as in traditional windings.

A problem with concentrated windings is that, as the number of slots reserved for the winding per motor pole is smaller than in traditional motors, the magnetomotoric force produced in the air gap by the winding deviates greatly from a continuous sinusoidal pattern, thus containing more harmonics than in traditional windings. These harmonics produce both torque ripple and eddy currents in the motor.

Specification U.S. Pat. No. 6,894,413 discloses a generator in which the rotor is magnetized by permanent magnets and the stator has a concentrated fractional-slot winding. In the specification, the rotor diameter is defined by the equation:

$$D \geq 0.00045 \times P_{out}$$

where D stands for the rotor diameter and $P_{out}$ for the power produced by the generator. Thus, for example, the rotor of a 5 kW generator has a diameter of at least 2.25 m. This is therefore a sizeable multi-pole and slowly rotating generator, which may be applied e.g. as a wind power generator. In the specification, harmonic components of the generator output voltage are also determined for certain different geometry combinations. The specification discloses which combinations can be utilized to reduce these harmonics, because, according to the specification, they cause eddy currents and consequently power losses in the generator. This specification also discloses the idea that the rotor can be assembled from thin laminated steel plates to reduce eddy currents, and likewise the idea that the rotor may be made from massive iron but the iron part is divided into segments to minimize eddy current losses.

In an effort to eliminate the torque ripple caused by a concentrated winding, e.g. a small slot opening has been used. Such a solution is disclosed at least in specification U.S. Pat. No. 6,882,080. According to this specification, a small slot opening reduces torque ripple, but the solution has the drawback that it is difficult to make the windings on a finished motor frame. Specification JP3451263 proposes a solution where the phase conductors are wound around the poles before assembly of the motor. This involves new stages of work in the assembly of the motor, which retards the production of the motor and increases the manufacturing costs.

OBJECT OF THE INVENTION

The object of the present invention is to achieve a motor in which the torque ripple caused by a concentrated fractional-slot winding in relation to the fundamental wave of the torque is reduced. An additional object of the invention is to disclose a motor of a construction that allows an improved manufacturability as compared to prior art. A further object of the invention is to disclose an advantageous method for manufacturing the motor.

BRIEF DESCRIPTION OF THE INVENTION

The motor of the invention is characterized by what is disclosed in the characterizing part of claim 1. The method of the invention is characterized by what is disclosed in the characterizing part of claim 8. Other embodiments of the invention are characterized by what is disclosed in the other claims.

Inventive embodiments are also presented in the description part and drawings of this application. The inventive content disclosed in the application can also be defined in other ways than is done in the claims below. The inventive content may also consist of several separate inventions, especially if the invention is considered in the light of explicit or implicit sub-tasks or with respect to advantages or sets of advantages achieved. In this case, some of the attributes contained in the claims below may be superfluous from the point of view of separate inventive concepts. Within the framework of the basic inventive concept, features of different embodiments of the invention can be applied in conjunction with other embodiments.

The invention concerns an electric motor having a concentrated fractional-slot winding and to a method for making a concentrated fractional-slot winding. The motor of the invention can be used for driving a people moving apparatus, such as an elevator, a hoisting machine, an escalator, a conveyor belt or conveying roller in a factory or warehouse or some other conveying apparatus designed for conveying people or goods. The motor of the invention is also applicable as a drive motor for vehicles, such as motor cars or trains.

A drive motor according to the invention for a conveying apparatus comprises at least a stator, a rotor and an air gap between these. In the motor of the invention, the stator and/or rotor comprises slots formed by a slot bottom and a slot opening, and teeth between slots, and the stator and/or rotor has a concentrated winding fitted in it. The concentrated winding is a fractional-slot winding having a slot number of 0.5 at most. The width of the slot opening of the motor slots on the side facing the air gap is at least 75% and at most 125% of the width of the slot bottom. In connection with this invention, width of the slot bottom refers to the maximum slot width that can be filled by the windings and slot insulation. When the width of the slot opening in the case of a concentrated winding increases to at least 75% of the slot bottom width, it can be established mathematically and experimentally that the torque ripple of the motor in relation to the fundamental torque wave is reduced to a substantially lower level than in the case of half-open slot openings narrower than this. The motor torque as well as the torque ripple are generated by the joint action of all pole pairs of the motor. With the motor parameters proposed in the invention, the torque ripple of the motor is reduced while the fundamental wave of the torque remains almost unchanged. Frequency of the fundamental torque wave refers to the electric frequency of the motor, i.e. the frequency of rotation of the magnetic flux in the stator and rotor. The electric frequency is obtained by multiplying the frequency of mechanical rotation of the motor by the number of pole pairs of the motor.

In a motor according to the invention, the fractional-slot winding is a concentrated two-layer winding, which is fitted in slots having open slot openings to allow the windings to be more easily fitted into the slots.

In a preferred embodiment of the invention, the slot bottom width is constant with respect to the slot length, and therefore the winding efficiently fills the slot.

In a preferred embodiment of the invention, the motor winding comprises n phase windings, of which at least one phase winding comprises only one continuous conductor fitted as a coil group to facilitate mechanical winding of the coil group.

In a motor according to the invention, the rotor and/or stator winding is a fractional-slot winding with a slot number of ⅖.

In a preferred embodiment of the invention, the aforesaid motor is a permanent-magnet synchronous motor.

In a motor according to the invention, the rotor is permanently magnetized, the rotor magnets are placed on the surface of the rotor and the protective shield of the magnets is preferably made from glass fiber laminate to reduce eddy current losses. However, the protective shield of the magnets may also be made from another material having a low permeability to magnetic field, such as stainless steel or plastic.

The aforesaid motor according to the invention may also be an elevator motor. In this case, the motor of the invention can be installed as part of an elevator system, and it can be utilized to move an elevator car in an elevator shaft. The traction sheave of the elevator may also be fitted in conjunction with the rotor of the elevator motor. The traction sheave may be e.g. secured to the rotor by means of a specific securing element or it may be implemented as a fixed part of the rotor.

In an elevator system, a motor according to the invention is fitted in the elevator shaft between the elevator car and a guide rail, but the motor may also be placed elsewhere in the elevator shaft or it may also be placed in a machine room. Further, the motor of the invention can be used in both elevator systems without counterweight and in elevator systems provided with a counterweight.

The motor of the invention may be either an axial flux machine or a radial flux machine. In an axial flux machine, the magnetic flux crosses the air gap of the motor in a direction substantially parallel to the axis of rotation of the motor, whereas in a radial flux machine the magnetic flux crosses the air gap substantially in the direction of the radius of the motor.

In a preferred embodiment of the invention, the stator and/or rotor comprises a winding frame to facilitate the manufacture of the winding of the motor.

The inventive concept also comprises a method for manufacturing the drive motor of a conveying apparatus.

In a method according to the invention for manufacturing the drive motor of a conveying apparatus, the motor comprises a stator, a rotor and an air gap between these, in which motor the stator and/or rotor comprises slots formed by a slot bottom and a slot opening, and teeth between slots. In a method according to the invention, the slot opening is so implemented that its width on the side facing the air gap is at least 75% and at most 125% of the width of the slot bottom. In addition, a concentrated fractional-slot winding is fitted in the slots, the winding having a maximum slot number of 0.5.

A method according to the invention relates to the manufacture of an n-phase concentrated fractional-slot winding.

The winding contains a number m of basic winding sections, and each phase winding comprises an equal number m of coil pairs. In the method, a first phase winding of the motor is wound to form a coil group from a continuous conductor preferably by using a coil winder, in such manner that a first and a second coil of the phase winding are wound to form a first coil pair surrounding two mutually adjacent teeth, a third and a fourth coil are wound to form a second coil pair surrounding two mutually adjacent teeth, and the distance between the first and the second coil pairs in the winding is adapted to be equal to a conductor length determined by the length b of the basic winding section, this conductor length forming a front-end conductor. The coil winder may be a rotary-shaft device to which the conductor is attached and then wound to form a finished coil. By the method of the invention, the coil winder can be used to wind all the coils of a motor phase winding simultaneously to form a coil group from a continuous conductor. As the coil group is formed from a continuous conductor and the coils in the same coil group are thus electrically connected together, it is not necessary to separately connect the coils to each other, which saves labor and time.

According to a preferred embodiment of the invention, the first phase winding of the motor is further wound to form a coil group so that the coil pairs 1, 2, . . . m−1, m of the first phase winding are fitted in succession in the coil group in an order determined by the sequence number of the coil pair, in such manner that the distance between each two successive coil pairs in the winding is fitted to be equal to a conductor length determined by the length of the basic winding section, said conductor length forming a front-end conductor.

In a preferred embodiment of the invention, the phase windings of all n phases of the motor are wound to form coil groups in the same way as the phase winding of the first phase of the motor.

In a method according to the invention, the two coils of the first coil pair of the first phase winding of the motor are fitted as a coil pair in a first basic winding section in mutually adjacent slots around a first and a second tooth in such manner that mutually adjacent coil sides of the coils are placed in the same slot, the phase current flowing through the first coil around the first tooth and the phase current flowing through the second coil around the second tooth flow in mutually opposite directions and that a slot insulation is fitted in conjunction with the coil sides of the first and second coils fitted in the same slot so that the slot insulation remains between the slot bottom, side wall and coil sides. The slot insulation may also consist of two separate slot insulations which are fitted separately in conjunction with the two coil sides in the same slot so that the slot insulations remain between the bottom, side wall and coil sides and that both slot insulations remain between the coil sides to improve the insulation between the coil sides.

In a method according to the invention, the two coils of the first coil pair of a second phase winding of the motor are fitted in mutually adjacent slots in the first basic winding section in the same way as the two coils of the first coil pair of the first phase winding in such manner that the phase currents in the first coil pair of the first phase winding and in the first coil pair of the second phase winding flow in opposite directions, the first coil pair of the first phase winding and the first coil pair of the second phase winding are fitted side by side in such manner that the coil sides closest to each other are fitted in the same slot and that a slot insulation is fitted in conjunction with the coil sides placed in the same slot so that the slot insulation remains between the slot bottom, side wall and coil sides.

In the method of the invention, the first coil pairs of the motor phases 1, 2, . . . , n−1, n are fitted in the first basic winding section side by side according to the sequence number of the phase in such manner that the coil pairs of phases with successive sequence numbers are fitted side by side in the same way as the first coil pairs of the first and second phase windings of the motor.

In a method according to the invention, the second coil pair of the first phase of the motor is fitted into slots in the second basic winding section in the same way as the first coil pair of the first phase in such manner that the edgemost and mutually adjacent coil sides in the first and second basic winding sections are fitted into the same slot and that a length of conductor determined by the length of the basic winding section is left between the first and second coil pairs of the first phase to form an end winding.

The second coil pair of the second phase of the motor is fitted into slots in the second basic winding section in the same way as the second coil pair of the first phase.

In a preferred method according to the invention, the coil pairs of motor phases 1, 2, . . . , n−1, n are fitted into slots in the second basic winding section in the same way as in the first basic winding section.

In a method according to the invention, the coil pairs are fitted in basic winding sections 1, 2, . . . , m−1, m in the same way as in the first and second basic winding sections in such manner that a phase winding coil pair is placed in each basic winding section in an order determined by the sequence number of the phase, basic winding sections with successive sequence numbers are fitted side by side in the same way as the first and second basic winding sections and two coil sides are fitted in each slot.

In a method according to the invention, a slot-closing insulator is fitted in the slot over the coil sides so that the slot-closing insulator comes into contact with the slot insulation throughout the length of the slot.

According to the invention, it is also possible to wind the coil pairs in parallel. Further, in connection with or after the winding operation, the coil pairs can also be fitted in a specific winding frame, and the winding frame can be fitted in conjunction with the motor slots and teeth.

ADVANTAGES OF THE INVENTION

The solution of the invention provides the advantage that the torque ripple of the motor can be substantially reduced when the width of the slot opening is at least 75% of the width of the slot bottom. The fundamental torque wave still remains substantially unchanged. This is advantageous when a conveying apparatus is driven by a drive motor according to the invention, because torque ripple is a disadvantage in the operation of the conveying apparatus, such as an elevator, and impairs its traveling comfort, causing vibration and noise. The vibration appears as vibration at the characteristic frequency of the elevator mechanism, and as constrained oscillation, which makes the system oscillate even if the frequency of the excitation is not the same as the characteristic frequency of the elevator mechanism. Vibration also causes wear of the mechanism of the conveying apparatus and reduces its useful life.

When the width of the slot opening is at least 75% of the width of the slot bottom, the slot opening can be regarded as being substantially open. This also facilitates the winding of the motor. The windings can be prepared as finished coils before being fitted in place, because, the slot opening being substantially open, the windings can be fitted in place on a finished rotor and/or stator. Further, according to the manufacturing method described in the invention, a motor phase winding can be wound as a coil from a single continuous conductor e.g. mechanically by using a winding coiler, which facilitates the winding operation and reduces the manufacturing costs of the motor.

By virtue of the concentrated fractional-slot winding disclosed by the invention, the number of pole pairs in the motor can be substantially increased as compared to traditional distributed windings, wherein the conductors of different phases are placed in slots in a manner such that each two mutually adjacent slots contain coil sides of different phases. At the same time, the proportion of end windings in the motor is reduced, which reduces the amount of copper needed for the windings in the motor. This also leads to a substantial fall in the price of the motor. In addition, the size of the motor is reduced, which is necessary in the case of motors used in elevators especially if the elevator motor is placed in the elevator shaft.

As there are not as many crossings between the end windings of the motor as in distributed-winding motors of the old type, the required insulation of end windings is also reduced. Since crossings between end windings are reduced, the risk of breakdown of the windings is also reduced and the reliability of the motor is improved.

The winding according to the invention comprises a non-predetermined number of phases, but in the embodiment examples presented below a three-phase winding is described by way of example. This winding has the advantage that, when the windings are wound in a star configuration, a separate neutral conductor need not necessarily be connected to the star point, because it is now possible to arrange for the neutral conductor to carry no current.

DETAILED DESCRIPTION OF THE INVENTION

In the examples to be described in the following, the invention is set forth by the aid of a three-phase motor in which the stator is provided with a concentrated fractional-slot winding and the rotor with permanent magnets. In this embodiment of the invention, the coils comprised in the phase winding are wound in series, but they can also be wound in parallel.

Figure 1:
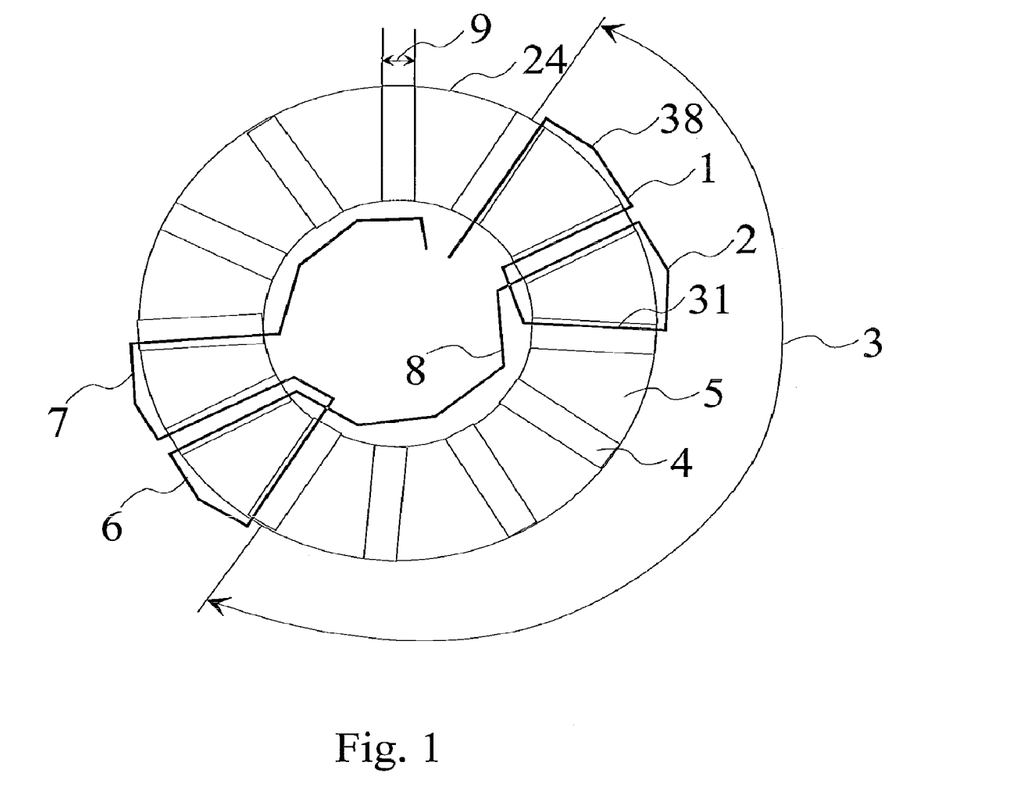
FIG. 1 represents an axial-flux machine according to the invention, provided with a concentrated fractional-slot winding.

FIG. 1 represents an axial-flux machine stator provided with a concentrated fractional-slot winding. The stator comprises slots 4 and teeth 5. The coils are wound around teeth to form a concentrated winding in a manner such that the coil sides 31 of the same coil are placed in mutually adjacent slots. In this way, the end windings 38 remain short as they only extend between two adjacent slots. Coils 1 and 2 form a first coil pair of the first phase, and coils 6 and 7 form a second coil pair of the first phase. The figure shows the distance 3 between the first and the second coil pairs. This distance is also the extent of the basic winding section. Depicted in the figure is also a front-end conductor 8, which connects the first 1,2 and the second 6,7 coil pairs of the first phase to each other. In FIG. 1, the coils contain only one conductor loop, but they may also have a larger number of conductor loops. In the motor according to this figure, the width of the slot bottom 9 is constant throughout the length of the slot to ensure that the coils fill the slots as effectively as possible.

Figure 2:
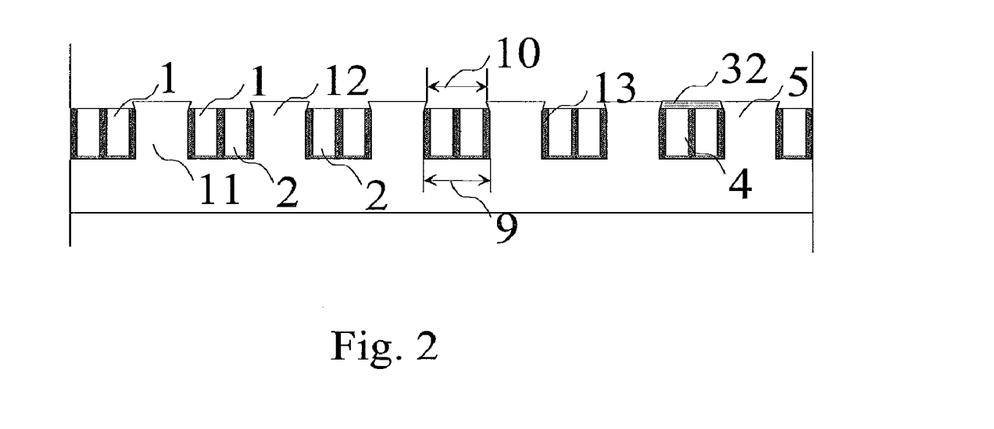
FIG. 2 represents a cross-section of a part of a stator rim according to the invention, depicted in a straightened form.

FIG. 2 represents a part of a stator rim according to the invention, depicted in an unbent form. The motor has substantially open slot openings, the width 10 of the slot opening being at least 75% of the width 9 of the slot bottom. The first 1 and second 2 coils of the first phase are fitted in slots around two mutually adjacent teeth to form a coil pair 1,2 so that that the direction of flow of the phase current around the tooth 11 surrounded by coil 1 is opposite to the direction of flow of the current around the tooth 12 surrounded by coil 2. In each slot, two coil sides are fitted. A slot insulation 13 is fitted in the slots in such a way that the slot insulation remains between the coil sides and the bottom and side walls of the slot.

Figure 3:
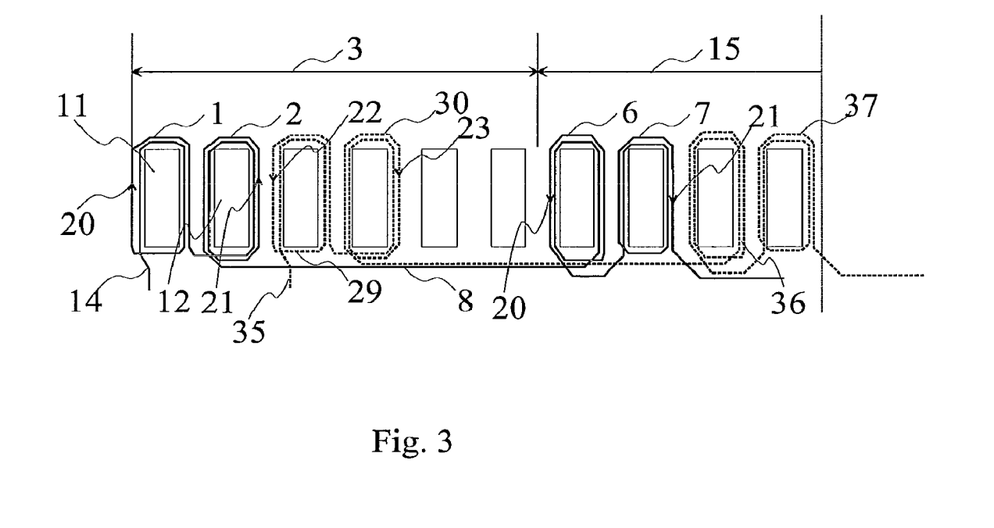
FIG. 3 represents a part of a stator rim according to the invention as seen perpendicularly from the direction of the air gap.

FIG. 3 represents a part of a stator rim according to the invention as seen perpendicularly from the direction of the air gap. The coils of the first phase are fitted in series to form a coil group such that successive coil pairs 1,2; 6,7 of the same phase are placed at a mutual distance 3 determined by the basic winding section. Two successive coil pairs are connected to each other by a front-end conductor 8 having a length equal to the extent of the basic winding section 3. The first phase is formed from only one coil group by fitting coil pairs in series in the manner coil pairs 1,2 and 6,7 have been fitted. In each basic winding section 3, 15, one coil pair is fitted in an order determined by the sequence number of the phase winding, so the number of coil pairs is equal to the number of basic winding sections. The first phase winding 14 is wound from a single continuous conductor to facilitate mechanical winding. The direction of the phase current flowing into the motor phase winding in the first coil of the first coil pair of the first phase is indicated by arrow 20, and the direction of flow of the phase current in the second coil of the first coil pair of the first phase is indicated by arrow 21. Similarly, the direction of the phase current flowing into the motor phase winding in the first coil of the first coil pair of the second phase is indicated by arrow 22, and the direction of flow of the phase current in the second coil of the first coil pair of the second phase is indicated by arrow 23. According to the figure, the directions of the phase currents in the first coil pairs of the first and second phases are arranged to be opposite to each other. It can also be seen from the figure that the directions 20, 21 of the phase currents in the second coil pair 6,7 of the first phase are opposite to the phase current directions in the first coil pair of the first phase. In the coils according to FIG. 3, two conductor loops are fitted, but the number of conductor loops may also be different from this.

The coil pairs of all three phases of the motor illustrated in FIG. 3 are arranged on the stator adjacently to each other according to the sequence number in a manner such that the current directions in coil pairs of different phases are mutually opposite in the same way as in the coil pairs of the first and second phases.

Figure 4:
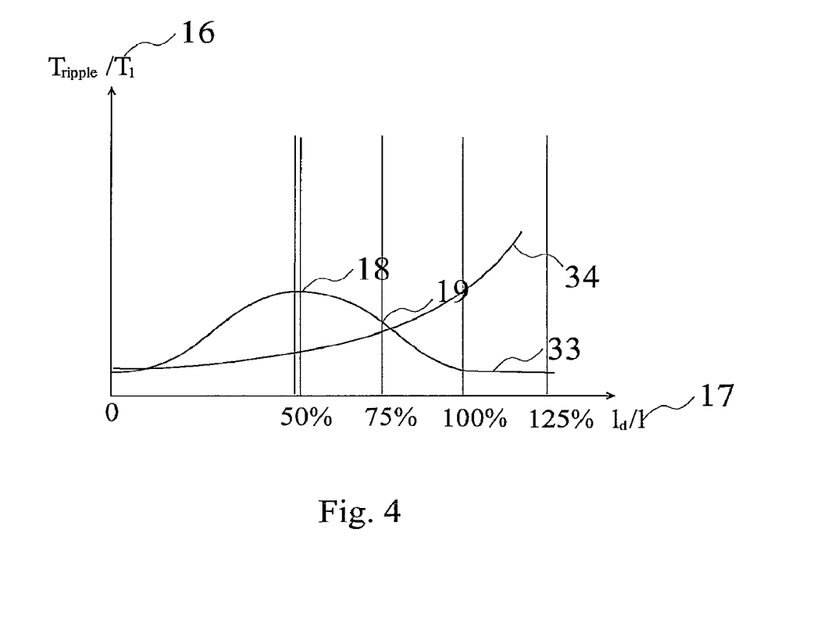
FIG. 4 represents a proportional graph of the torque ripple of the motor, depicted in relation to the width of the slot opening.

FIG. 4 describes the torque ripple of the motor in relation to the fundamental wave of the torque as a function of the width 17 of the slot opening. In FIG. 4, $T_{ripple}$ stands for the motor torque ripple and $T_1$ for the fundamental torque wave. Correspondingly, $l_d$ stands for the width of the slot opening and l for the width of the slot bottom. Curve 33 represents a graph of torque ripple in the case of a concentrated fractional-slot winding and curve 34 in the case of a traditional distributed winding, in which the phase winding is distributed into several slots in the pole area. In the case of a traditional winding, the torque ripple increases as the width of the slot opening increases. In the case of a concentrated fractional-slot winding, the torque ripple is at first small with closed slot openings, increases as the slot opening increases until, when the slot opening width increases beyond a certain value 18, the torque ripple begins to decrease again. According to the invention, when the slot opening width is at least 75% of the width 19 of the slot bottom, the torque ripple has decreased substantially from the value at point 18. Such a slot opening is also essentially open, and fitting the motor windings into such a slot opening is possible after the stator has been formed in the final shape.

Figure 5:
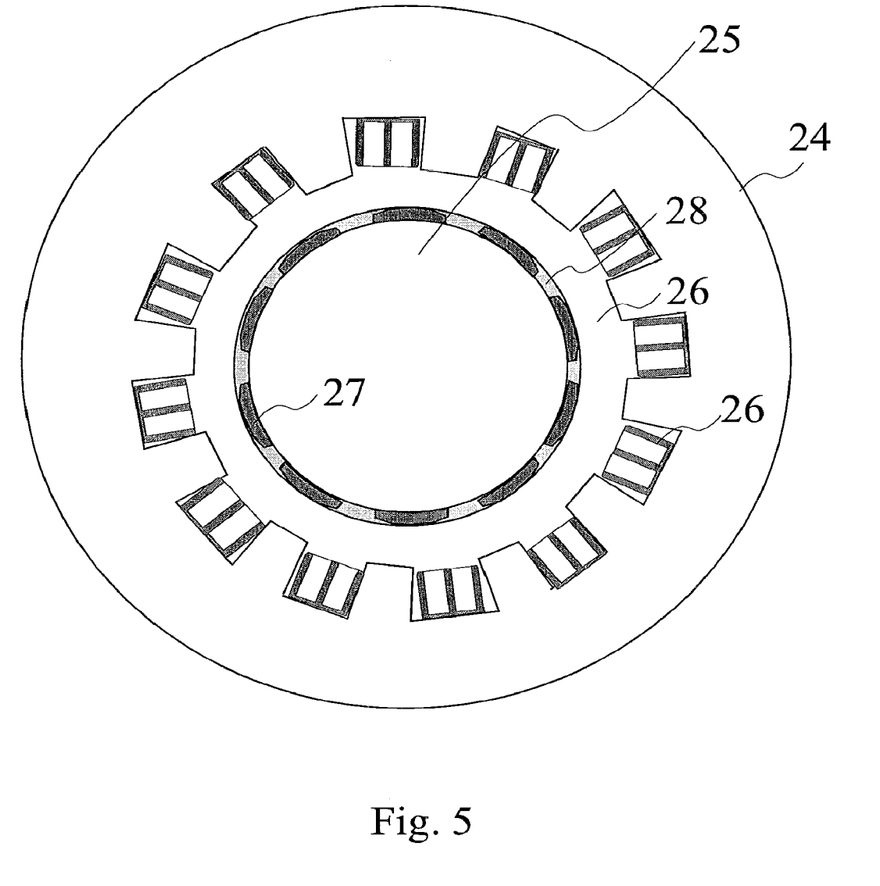
FIG. 5 represents an axial-flux machine according to the invention.

FIG. 5 represents a radial-flux motor in which the stator 24 has a concentrated fractional-slot winding and the rotor 25 has permanent magnets 27. The slot number of the motor means the number of stator slots 4 per phase and pole. As the motor according to FIG. 5 has 12 stator slots, 3 phases and 10 poles, the slot number will be ⅖.

Appendix 1 presents simulation results about a motor according to the invention. The simulations have been carried out with 50% and 100% ratios of the widths of the stator slot opening 10 and slot bottom 9.

Figure 6:
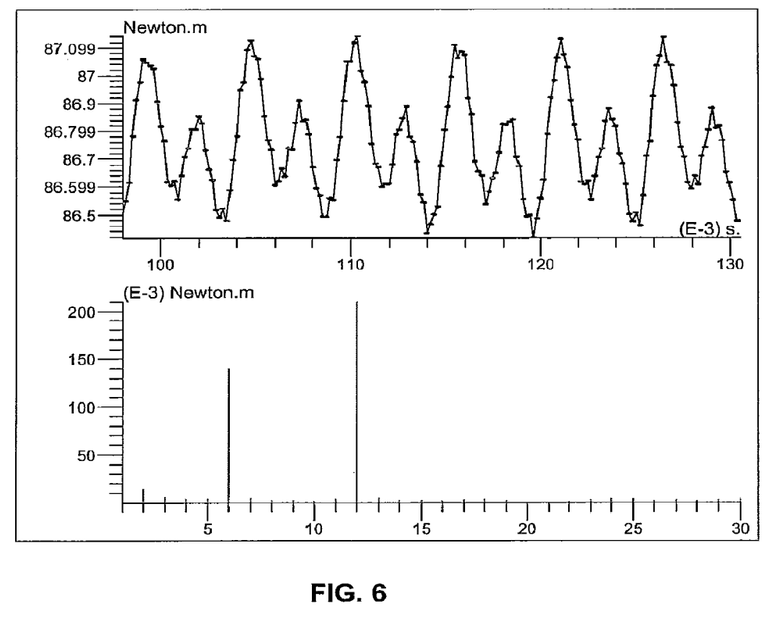
FIG. 6 represents simulation results in which the ratio of the widths of the slot opening and slot bottom of a stator is 50%.

FIG. 6 presents simulation results about a motor in which the ratio of the widths of the slot opening 10 slot bottom 9 of the stator is 50%. The upper one of the graphs represents the motor torque ripple as a function of time while the lower one of the graphs represents the torque spectrum. The $6^{th}$ and $12^{th}$ harmonics of the torque can be read from the graph of the torque spectrum.

Figure 7:
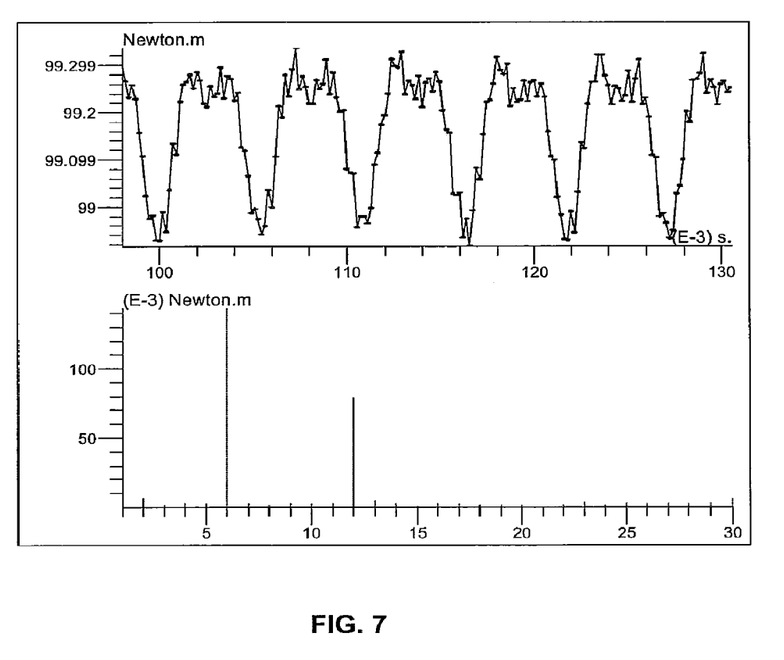
FIG. 7 represents simulation results in which the ratio of the widths of the slot opening and slot bottom of a stator is 100%.

FIG. 7 correspondingly presents simulation results about a motor in which the ratio of the widths of the slot opening 10 and slot bottom 9 of the stator is 100%.

According to FIG. 6, when the ratio of the widths of the slot opening 10 and slot bottom 9 of the stator of the simulated motor is 50%, the peak-to-peak magnitude of the torque ripple is 0.75% of the fundamental wave torque, and, according to FIG. 7, when the ratio of the widths of the slot opening and slot bottom increases to 100%, the peak-to-peak torque ripple decreases to 0.36% of the fundamental wave torque. In FIGS. 6 and 7, the torque harmonics spectrum has been determined using the electrical frequency of the motor as the fundamental frequency of the torque.

The invention is applicable e.g. in motors used in elevator systems for moving an elevator car. Such motors may be placed either in an elevator shaft or in a machine room. However, the invention is not limited to an individual application, but it can be applied in electric motors in general. Another advantageous application worth mentioning are escalator drive machines.

It is obvious to a person skilled in the art that the invention is not limited to the above-described embodiments, in which the invention has been described by way of example, but many variations and different embodiments of the invention are possible within the scope of the inventive concept defined in the claims set forth hereinafter.

The invention claimed is:

1. Drive motor for a conveying apparatus, comprising at least a stator (24), a rotor (25) and an air gap (26) between these, in which motor the stator and/or rotor comprises slots (4) formed by a slot bottom (9) and a slot opening (10), and teeth (5) between slots, and in which the stator and/or rotor has a concentrated winding (1, 2, 6, 7) fitted in the slots, characterized in that the concentrated winding is a fractional-slot winding having a maximum slot number of 0.5 and that the width of the slot opening (10) facing the air gap is at least 75% and at most 125% of the width of the slot bottom (9).

2. Motor according to claim 1, characterized in that the fractional-slot winding is a concentrated two-layer winding and that the winding is fitted in slots (4) having open slot openings to allow the winding to be more easily fitted into the slots.

3. Motor according to claim 1 or 2, the winding of which motor comprises n phase windings, characterized in that at least one phase winding (14) comprises only one continuous conductor fitted as a coil group to facilitate mechanical winding of the coil group.

4. Motor according to any one of claim 1 or 2, characterized in that the winding of the rotor (25) and/or stator (24) is a fractional-slot winding whose slot number is ⅖.

5. Motor according to any one of claim 1 or 2, characterized in that the said motor is a permanently magnetized synchronous machine.

6. Motor according to claim 5, characterized in that the motor has a permanently magnetized rotor (25) and that the rotor magnets (27) are placed on the surface of the rotor and the protective shield (28) of the magnets is preferably made from glass fiber laminate to reduce eddy current losses.

7. Motor according anyone of claim 1 or 2, characterized in that the said motor is an elevator motor.

\* \* \* \* \*